Patented July 27, 1948

2,446,114

UNITED STATES PATENT OFFICE 2,446,114

PREPARATION OF ESTERS

Roger W. Strassburg, Minneapolis, Minn., assignor to United States Rubber Company, New York, N. Y., a corporation of New Jersey No Drawing. Application June 14, 1947,
Serial No. 754,778

5 Claims. (Cl. 260—487)

This invention relates to a method for the alcoholysis of alkyl esters of α-halogeno aliphatic carboxylic acids with 2-propenyl alcohols.

For the alcoholysis of esters, the prior art has employed both acidic and basic catalysts to promote the reaction. However, in alcoholysis reactions involving 2-propenyl alcohols, e. g., allyl alcohol or methallyl alcohol, the use of acidic catalysts is ordinarily precluded in commercial operations by the tendency of such unsaturated alcohols to rearrange into other compounds in the presence of acids thereby decreasing the yield of the resulting 2-propenyl esters to an uneconomical level. Moreover, in the alcoholysis of esters of α-halogeno acids such as α-chloro acids, the use of the conventional basic catalysts is likewise disadvantageous because of the lability of the halogen atoms of α-halogeno aliphatic acids and their esters in alkaline media. Other catalysts occasionally employed by the art such as aluminum ethoxide and aluminum powder have likewise proven ineffectual.

I have now found that the alcoholysis of alkyl esters of α-halogeno aliphatic carboxylic acids with 2-propenyl alcohols proceeds rapidly and smoothly in the presence of elemental zinc to give high yields of the desired 2-propenyl esters of α-halogeno aliphatic acids. This catalytic effect of elemental zinc, which I have discovered is highly specific, since other elements of the same group, e. g., cadmium and mercury, display little or no catalytic activity in these alcoholysis reactions; and while a limited number of zinc salts, e. g., zinc chloride, do promote the alcoholysis to a limited extent their effect is far less than that of elemental zinc itself. The amount of the zinc catalyst operable in my invention may be as little as 0.1% by weight based on the weight of the reactants and need seldom exceed 1.0%. To secure the optimum catalytic effect, the zinc is preferably employed in a form such that it presents a very highly extended surface, e. g., a finely divided form, such as commercial zinc dust. The amount of the catalyst employed will depend somewhat upon how highly extended it is. The range given above applies to zinc powder which is sufficiently finely divided to pass a 100-mesh sieve.

The method of my invention is applicable to alcoholysis reactions involving 2-propenyl alcohols of the type formula

HO—CH$_2$—C(R)=CH(R)

where R is hydrogen, chlorine or lower alkyl, such as allyl alcohol, methallyl alcohol, ethallyl alcohol, crotyl alcohol, 2-chloroallyl alcohol and tiglyl alcohol.

Any alkyl ester of the α-halogenated aliphatic carboxylic acid may be employed in the practice of the present invention. The alkyl group may have from 1 to 20 carbon atoms. Thus it may be methyl, propyl, butyl, hexyl, etc. It is preferred that the alkyl group of the ester employed as starting material be one of which the corresponding alcohol is sufficiently lower-boiling than the 2-propenyl alcohol employed to permit forcing of the alcoholysis reaction to essential completion by distillation of the alcohol formed during the reaction. Thus, for example, the alcoholysis of methyl trichloroacetate with allyl alcohol is carried out by heating the reaction mixture at the boiling point of methyl alcohol, which distills out of the reaction mixture as rapidly as it is formed.

My invention has greatest importance when applied to alkyl esters of α-chloro aliphatic acids but it is also applicable where a halogen other than chlorine, such as bromine or iodine, is substituted on the carbon atom alpha to the carboxylic group of the acid. Any α-halogenated aliphatic carboxylic acid may be used in the practice of my invention. Examples are saturated monobasic acids such as acetic, propionic, n-butyric, isobutyric, valeric, and higher homologs ranging up to stearic; saturated dibasic acids such as malonic, succinic, glutaric, adipic, pimelic, suberic, azelaic, sebacic, etc.; unsaturated monobasic acids such as acrylic, methacrylic, crotonic, vinylacetic, dimethylacrylic, allylacetic, angelic, tiglic, undecylenic, oleic, etc.; unsaturated polybasic acids such as maleic, fumaric, citraconic, mesaconic, itaconic, etc.

Exemplary of the lower-alkyl esters of α-halogeno aliphatic acids which may be employed in carrying out the present invention are the methyl and ethyl esters of chloroacetic acid, trichloroacetic acid, α-chloropropionic acid, α,α-dichlorostearic acid and α-chloroacrylic acid.

The relative proportions of the alkyl ester of the α-halogenated aliphatic carboxylic acid and the 2-propenyl alcohol may vary within wide limits. However, it is preferred to use a considerable excess of the 2-propenyl alcohol because it promotes the reaction in the desired direction. Generally at least 1.5 mols of the 2-propenyl alcohol per mol of the alkyl ester of the α-halogenated aliphatic acid will be employed. Preferably from 1.75 to 2.25 mols of the 2-propenyl alcohol per mol of the ester are used.

Since the 2-propenyl esters formed by the method of my invention are polymerizable, it is preferable after their preparation to distill them, e.g., in purification, in the presence of conventional polymerization inhibitors. For this purpose I have found sym-di-β-naphthyl-p-phenylenediamine to be particularly satisfactory since it can be added before or during the alcoholysis reaction without detrimental effect. Other suitable polymerization inhibitors include related compounds of the antioxidant type, e.g., phenyl-β-napthylamine, sym - diphenyl - p - phenylenediamine, acetone-aniline reaction products, and the commercial rubber antioxidants known to the art as acetone-diphenylamine condensates. Any other polymerization inhibitor which is effective to prevent polymerization of any unsaturated material present, whether it be the desired 2-propenyl ester or the reactant 2-propenyl alcohol, may be employed. The amount of the polymerization inhibitor may vary widely depending upon the particular one which is employed, the temperature, etc., but the amount thereof may conveniently range from 0.1% to 2% by weight based on the weight of the reactants originally employed. The inhibitor may be added at the start of the alcoholysis reaction, during the reaction, or after it has been completed but prior to the distillation of the 2-propenyl ester product.

In accordance with a typical method of carrying out my invention, a mixture of the alkyl ester of the α-halogenated aliphatic acid, an excess of the 2-propenyl alcohol, and the elemental zinc catalyst, together with a polymerization inhibitor if desired, is placed in a suitable reaction vessel and heated to the boiling point, at which point the saturated aliphatic monohydric alcohol liberated by the alcoholysis is vaporized, and the resulting vapors are led into a fractional distillation column where they are rectified in known manner to separate the liberated monohydric alcohol in substantially pure form and in substantial entirety from higher-boiling materials which are returned to the reaction zone. The saturated monohydric alcohol thus recovered may be condensed and collected. The saturated monohydric alcohol withdrawn from the system may be put to any desired use, as for example for esterifying α-halogenated aliphatic acid to form more ester for feeding to the reaction zone. After the reaction is completed, as indicated by the cessation of distillation of the saturated monohydric alcohol, the residual reaction mixture may be distilled, preferably under reduced pressure in order to minimize decomposition reactions, to recover first a fraction of the unreacted excess 2-propenyl alcohol and then a fraction of the 2-propenyl ester of the α-halogenated carboxylic acid.

The process described above is illustrative of the batchwise methods which are most suitable for laboratory and small scale operations. However the process can be modified in an obvious manner to permit continuous operation which is preferable for large scale production.

The following examples disclose my invention in more detail; all parts are by weight.

*Example 1*

A mixture of 366 parts of ethyl chloroacetate, 432 parts of methallyl alcohol, 2 parts of zinc dust and 2 parts of sym-di-β-naphthyl-p-phenylenediamine are charged into a distillation vessel fitted with a packed column and variable take-off distillation head. The reaction mixture is heated to such temperature that the ethanol being formed in the reaction distills off continuously, at atmospheric pressure. When distillation of ethanol ceases, the unreacted methallyl alcohol is removed by distillation at 25 mm. pressure. Distillation of the residue yields 357 parts (80% of theory) of methallyl chloroacetate, boiling at 67–67.5° C./10 mm.; $n_D^{20}=1.4477$;

sp. gr. $^{20}_{20}=1.133$ chlorine, 23.8% (theory, 23.9%).

Repetition of the above procedure in the absence of zinc yielded none of the methallyl ester. The same negative results are obtained in the presence of aluminum ethylate and of 20-mesh metallic aluminum. In the presence of 0.1 part of zinc chloride, the alcoholysis reaction yields only 39% of the theoretical amount of the methallyl ester.

*Example 2*

A mixture of 340 parts of ethyl α-chloropropionate, 360 parts of methallyl alcohol and 1.7 parts of zinc dust is reacted in the manner of Example 1. After the ethyl alcohol has been removed in the same way as in Example 1, 1.7 parts of sym-di-β-naphthyl-p-phenylene-diamine are added, and the reaction mixture is evaporated at 25 mm. to remove unreacted methallyl alcohol. The residue is distilled to yield 353 parts (78% of theory) of methallyl-α-chloropropionate, B. 56–58° C./5 mm.; $n_D^{20}1.477$; chlorine, 21.7% (theory, 21.8%).

*Example 3*

A mixture of 366 parts of ethyl chloroacetate, 360 parts of allyl alcohol, 1.8 parts of zinc dust and 1.8 parts of sym-di-β-naphthyl-p-phenylenediamine is charged into the distillation apparatus described in Example 1. The reaction mixture is heated to such temperature that ethyl alcohol distills off as it is formed, at atmospheric pressure. At the end of the reaction the unreacted allyl alcohol is removed by evaporation at approximately 50 mm. and the residue is submitted to vacuum distillation. In this way are obtained 366 parts (91% of theory) of allyl chloroacetate, B. 68–69° C./20 mm.; $n_D^{20}=1.4455$; chlorine, 26.2% (theory, 26.3%).

*Example 4*

A mixture of 383 parts of ethyl trichloroacetate, 280 parts of methallyl alcohol, 1.7 parts of zinc dust and 1.7 parts of sym-di-β-naphthyl-p-phenylenediamine is charged into a distillation vessel similar to that of Example 1. The reaction is carried out as in previous examples and ethyl alcohol is distilled continuously from the reaction mixture as it is formed, together with a small amount of isobutyraldehyde formed as an incidental by-product. The alcoholysis reaction yields 188 parts of methallyl trichloroacetate, B. 74–76° C./10 mm.; $n_D^{20}1.4672$; chlorine, 48.08% (theory, 48.8%).

*Example 5*

A mixture of 30.1 parts of methyl α-chloroacrylate, 29 parts of allyl alcohol, 0.14 part of zinc dust and 0.14 part of sym-di-β-naphthyl-p-phenylenediamine is heated for approximately four hours at a temperature sufficient to effect distillation of the methanol formed during the reaction. At the end of the reaction, the unreacted allyl alcohol is evaporated under diminished pressure as in previous examples, and the residue is distilled in vacuo yielding 17.9 parts of allyl α-chloroacrylate, B. 69–70° C./24 mm.; $n_D^{20}1.4585$.

Having thus described my invention, what I claim and desire to protect by Letters Patent is:

1. A method of preparing 2-propenyl esters of α-halogenated aliphatic carboxylic acids which comprises heating a mixture of a lower alkyl ester of an α-halogenated aliphatic carboxylic acid and a 2-propenyl alcohol, the saturated aliphatic alcohol corresponding to the lower alkyl group in said ester being substantially lower-boiling than the 2-propenyl alcohol, in the presence of elemental zinc as a catalyst, and distilling the saturated aliphatic alcohol corresponding to the lower alkyl group in said ester out of the reaction mixture as rapidly as it is formed.

2. A method of preparing 2-propenyl esters of α-halogenated aliphatic carboxylic acids which comprises heating a mixture of a lower alkyl ester of an α-halogenated aliphatic acid and an excess of 2-propenyl alcohol, the saturated aliphatic alcohol corresponding to the lower alkyl group in said ester being substantially lower-boiling than said 2-propenyl alcohol, in the presence of elemental zinc as a catalyst, distilling the saturated aliphatic alcohol corresponding to the lower alkyl group in said ester out of the reaction mixture as rapidly as it is formed, fractionally distilling the liberated vapors comprising said saturated aliphatic alcohol, removing an overhead fraction consisting essentially of said saturated aliphatic alcohol, returning the fraction of heavier material to the reaction zone, and, when distillation of said fraction of saturated aliphatic alcohol ceases, distilling out of the reaction mixture the excess of 2-propenyl alcohol under reduced pressure, and thereafter distilling the 2-propenyl ester of said α-halogenated aliphatic carboxylic acid out of the residual reaction mixture under reduced pressure.

3. The method of claim 1 wherein said α-halogenated aliphatic carboxylic acid is an α-chlorinated aliphatic carboxylic acid.

4. The method of claim 1 wherein the reaction and distillation are conducted in the presence of a polymerization inhibitor effective to prevent polymerization of any unsaturated material present.

5. The method of claim 2 wherein the reaction and distillation steps are conducted in the presence of a polymerization inhibitor effective to prevent polymerization of any unsaturated material present.

ROGER W. STRASSBURG.